US007488077B2

(12) United States Patent
Sarayeddine et al.

(10) Patent No.: US 7,488,077 B2
(45) Date of Patent: Feb. 10, 2009

(54) OBJECTIVE FOR A PROJECTION APPARATUS, AND CORRESPONDING FRONT-PROJECTION OR BACKPROJECTION APPARATUS

(75) Inventors: Khaled Sarayeddine, Nouvoitou (FR); Jean-Jacques Sacre, Chateaugiron (FR); Pascal Benoit, Liffre (FR)

(73) Assignee: Thomson Licensing, Boulogne Billancourt (FR)

( * ) Notice: Subject to any disclaimer, the term of this patent is extended or adjusted under 35 U.S.C. 154(b) by 389 days.

(21) Appl. No.: 10/560,863

(22) PCT Filed: Jun. 4, 2004

(86) PCT No.: PCT/EP2004/006079

§ 371 (c)(1),
(2), (4) Date: Dec. 7, 2005

(87) PCT Pub. No.: WO2004/111699

PCT Pub. Date: Dec. 23, 2004

(65) Prior Publication Data
US 2007/0097507 A1 May 3, 2007

(30) Foreign Application Priority Data
Jun. 11, 2003 (FR) .................. 03 07031
Mar. 15, 2004 (FR) .................. 04 02629

(51) Int. Cl.
*G03B 21/28* (2006.01)
(52) U.S. Cl. .............. 353/77; 353/98; 353/97; 353/78
(58) Field of Classification Search .......... 353/74, 353/77, 78, 98, 99
See application file for complete search history.

(56) References Cited
U.S. PATENT DOCUMENTS 4,395,093 A 7/1983 Rosendahl et al.
5,521,658 A 5/1996 Donohoe
5,920,376 A 7/1999 Bruckstein et al.
6,220,713 B1* 4/2001 Tadic-Galeb et al. .......... 353/77
6,853,493 B2* 2/2005 Kreitzer ..................... 359/651
7,239,360 B2* 7/2007 Bassi et al. ................. 348/745
2003/0035221 A1* 2/2003 Yoneyama .................. 359/629
2007/0146647 A1* 6/2007 Sarayeddine et al. .......... 353/77
2007/0216877 A1* 9/2007 Sacre et al. .................. 353/97

FOREIGN PATENT DOCUMENTS

| EP | 1203977 | 5/2002 |
| EP | 1205791 | 5/2002 |
| JP | 6-11767 | 1/1994 |
| JP | 9-138349 | 5/1997 |
| WO | WO 98/08141 | 2/1998 |

OTHER PUBLICATIONS

Patent Abstracts of Japan, vol. 018, No. 211, Apr. 14, 1994 and JP 06-011767.
Patent Abstracts of Japan, vol. 1997, No. 09, Sep. 30, 1997 and JP 09-138349.
Search Report Dated Oct. 6, 2004.

* cited by examiner

*Primary Examiner*—William C. Dowling
(74) *Attorney, Agent, or Firm*—Joseph J. Laks; Harvey D. Fried; Patricia Verlangieri

(57) ABSTRACT

The invention relates to a projection objective comprising at least one lens and intended to transmit a divergent light beam onto a flat screen. A hyperbolically shaped mirror is oriented so as to receive, on its convex face, the light emanating from the lens.

The invention also relates to a corresponding projection apparatus.

16 Claims, 11 Drawing Sheets

US 7,488,077 B2

OBJECTIVE FOR A PROJECTION APPARATUS, AND CORRESPONDING FRONT-PROJECTION OR BACKPROJECTION APPARATUS

FIELD OF THE INVENTION

The invention relates to an objective for a front-projection or backprojection apparatus, making it possible to obtain a wide projection angle without distortion. The invention also relates to the application of such an objective to front-projection and backprojection apparatuses.

PRIOR ART

FIG. 1 shows a conventional design of a backprojector. In this design, the illumination beam emitted by the projector is folded by one or two return mirrors M1 or M2. These mirrors make an angle of approximately 36° with the screen. The optical system of the backprojector may be up to 45 centimetres in thickness for a screen having dimensions of 1106 by 622 millimetres. The cone angle along the diagonal of the screen must be about 38°. An acceptable distortion and an acceptable MTF (Modulation Transfer Function) can be obtained with an objective consisting of some ten lenses for moderate cost. The thickness of the apparatus is then, for example, 50 centimetres.

Another design involves folding the beam twice, as shown in FIG. 2, using two mirrors M1, M2 placed facing each other, which are parallel to the screen, and a projection objective that works with a field off-centred with respect to its optical axis.

FIG. 3 shows how the distance between the centre of the screen and the optical axis of the objective is determined. In FIG. 2, the mirror M1 lies in the plane of the screen. A ray that has to reach the top of the screen (on the left in FIG. 2) must firstly be reflected by the top of the mirror M1 and therefore pass through a point located below the screen. The maximum angle of the field depends on the thickness d of the projector, the height H of the screen and the diameter p of the pupil of the objective according to the following formula:

$$\alpha = \arctan[(H+p/3)/2d].$$

To produce a projector whose optical system has a thickness of 200 millimetres, with the following values: H=622 mm and p=4 mm, it is necessary to have an angle α with a value of 57.36° and the distance D between the centre of the screen and the optical axis of the objective will be 591 mm. To operate correctly with these values, the system must use the lateral field of the objective, that is to say the image source for illuminating the screen is off-centre with respect to the axis of the objective.

SUMMARY OF THE INVENTION

It is an object of the invention to produce an objective for projecting a plane image at a distance that is even closer than in the known systems. This objective makes it possible, in addition, to correct the distortions that the system could induce. In particular, the object of the invention is to use a hyperbolic mirror in this objective. A known system, such as that disclosed in U.S. Pat. No. 5,716,118 uses a hyperbolic mirror, but the mirror used is concave and must be large in order to obtain a large image. Such a system is therefore difficult to make industrially viable owing to the difficulties in producing such a large mirror. The invention relates to an objective for an industrially viable projector or backprojector that makes it possible to obtain large projected images.

The invention therefore relates to a projection objective comprising a combination of lenses comprising a front group ($Gr_{front}$) of lenses and a rear group ($Gr_{rear}$) of lenses that are placed on either side of a diaphragm and are intended to transmit a divergent light beam to a flat screen, and including at least one lens and at least one hyperbolically shaped mirror, oriented so as to receive, on its convex face, the light coming from the said front group ($Gr_{front}$) of lenses and to transmit the said beam to the said screen.

Preferably, a first focus of the hyperbolically shaped mirror is positioned in the region, called the pupil region, defined by the image of the diaphragm by the front group of lenses ($Gr_{front}$). According to one particular feature, the hyperbolic mirror is designed and positioned relative to the front group ($Gr_{front}$) of lenses so that the first focus of the hyperbola lies approximately in the plane of the pupil of the front group of lenses, which hyperbola is located on the opposite side to the hyperbolic mirror relative to the front group of lenses, whereas the second focus lies approximately in the plane of the exit pupil of the front group of lenses.

Advantageously, the said rear group of lenses and/or the said front group of lenses include/includes at least one geometric-distortion correcting optic that has a surface in the shape of a conic. Preferably, this geometric-distortion correcting optic is located in the rear group of lenses and has a hyperbolically shaped surface. In addition, this geometric-distortion correcting optic is preferably located in a region far from the diaphragm of the objective. More precisely, the geometric-distortion correcting optic is preferably located in that part of the rear group of lenses furthest away from the diaphragm.

The conics of the hyperbolic mirror (M1) and of the geometric-distortion correcting optic (L'1) may be in a ratio that is approximately proportional to the ratio of the positions of the foci of the hyperbola, that is to say the distances P2—Hyperbola and P1—Hyperbola.

In addition, a meniscus located close to the pupil of the objective may be provided in order to correct the astigmatism defects induced by the hyperbolic mirror. Advantageously, the objective thus includes at least one meniscus located in that part of the front group or of the rear group that is closest to the diaphragm and designed to correct the astigmatism defects induced by the hyperbolic mirror.

Moreover, provision may be made for the objective according to the invention to use a peripheral field of the object plane and for the hyperbolic mirror to be located entirely on one side of a plane passing through the axis of symmetry of the hyperbola so as to fold the beam without the objective casting a shadow on the image.

Preferably, the hyperbolic mirror is located entirely on one side of a plane passing through the axis of symmetry of the hyperbola; this axis of symmetry joins the foci of the hyperbola.

Advantageously, the optical axis of the lens is located on the axis of symmetry of the hyperbola passing through the foci of the hyperbola.

The lens of the objective generally consists of a combination of lenses, and therefore forms a complex lens.

According to an alternative embodiment, a first additional return mirror is placed near the front group of lenses of the objective in a first direction that corresponds to the direction of the beam transmitted by the lens, and reflects the said beam in a second direction not collinear with the first direction. The hyperbolic mirror is located along the second direction and is oriented in order to receive the beam reflected by the first return mirror. According to one embodiment, the second direction makes an angle of less than 60° with the said first direction.

Moreover, the objective advantageously includes two meniscuses located on either side of the diaphragm, the concave parts being oriented towards the diaphragm.

According to one particular feature, the diaphragm lies in the focal plane of the rear group of lenses.

Advantageously, the objective includes a positive lens located between one of the meniscuses belonging to the front group of lenses and the hyperbolic mirror. Thus, the envelope of the light rays of the field is reduced so as to make it easier to fold the light beam by means of a plane mirror, in order to reduce the overall size of the objective.

Such an objective is applicable to a front projection or backprojection apparatus. Preferably, the objective includes a display, such as a spatial light modulator, located on one side of the optical axis of this rear group of lenses and making it possible to transmit a modulated light beam to a region of the rear group of lenses that is located on one side of the axis (XX') of the said rear group of lenses.

To do this, the display, at least its optically active surface, is located entirely on one side of the optical axis of the lens, that is to say of the complex lens of the objective. The display is designed, in a manner known per se, to transmit a modulated light beam to this lens, that is to say to the entry of the objective. Thus, the objective is used in offset field so that the beam emanating from the hyperbolic mirror or, where appropriate, from the additional mirror is not intercepted by the lens or lenses of the objective.

In addition, the display is preferably of flat shape.

The invention is applicable to a backprojection apparatus in which at least a second return mirror receives the light reflected by the hyperbolic mirror and reflects it onto the rear face of the screen of the backprojection apparatus.

In such an arrangement, the return mirror preferably makes a zero angle with the plane of the screen. In an alternative embodiment of the invention, it makes a non-zero angle with the plane of the screen, for example 15°, which makes it possible to reduce the overall volume of the projector.

According to an alternative embodiment of the invention, the second mirror lies in the same plane as the said first return mirror.

Preferably, the objective is then mechanically coupled to the first mirror by a support piece.

LIST OF FIGURES

The various aspects and features of the invention will become more clearly apparent in the description that follows and in the appended figures which show:

In FIGS. 1 to 3, backprojection systems known in the art and already described above;

In FIGS. 4a to 4c, illustrative examples of an objective according to the invention;

In FIG. 5, an illustrative example of a backprojection apparatus according to the invention;

In FIG. 6, another illustrative example of a backprojection apparatus according to the invention;

In FIGS. 7a and 7b, diagrams describing precisely how the light rays propagate;

In FIGS. 8 to 10, various positions and orientations of the mirrors used within the context of the invention;

In FIG. 11 an example of the application of the invention to a front-projection apparatus;

In FIGS. 12a and 12b, an alternative embodiment of an objective according to the invention;

In FIGS. 13a, 13b and 14, diagrams for explaining the distortion and astigmatism corrections; and In FIG. 15, an illustrative example of an objective according to the invention.

DETAILED DESCRIPTION OF THE INVENTION

A basic illustrative example of an objective according to the invention will now be described with reference to FIG. 4a. This objective comprises a lens L'1 that is in fact a lens formed from a combination of lenses, that is to say a complex lens. A mirror M1 of hyperbolic shape HYP is placed on the exit side of the objective and in such a way that the axis of the hyperbola that passes through the foci of the hyperbola coincides with the optical axis XX' of the lens L'1.

The light transmitted by the lens is reflected by the hyperbolic mirror and seems to come from a point p' that is a conjugate point of the pupil of the objective (the image of the diaphragm produced by the front group of lenses).

As may be seen in FIG. 4a, the hyperbolic mirror makes the beam that it reflects more divergent. In addition, to prevent the lens L'1 from disturbing the transmission of the beam reflected by the hyperbolic mirror, provision may be made to use only that part M1 of the hyperbolic shape lying on one side of a plane passing through the axis of symmetry of the hyperbola. This axis passes through the foci of the hyperbola. The light emanating from the lens L'1 which can be used is therefore that lying on one side of a plane passing through the optical axis of the objective. An image illuminated by a light source and intended to be projected onto the screen will therefore be off-axis with respect to the axis of the objective.

Such an arrangement may in certain cases induce distortions and deterioration in the MTF (Modulation Transfer Function), i.e. deterioration in the spatial frequency response of the optical system. These defects are corrected by moving the hyperbolic mirror away from the objective and by interposing a lens L9 between the objective and the hyperbolic mirror, which lens makes it possible to balance the optical powers on either side of the diaphragm of the said lens and to reduce the angle of incidence of the rays of the beams on the hyperbolic mirror and especially to reduce the angle of incidence of the rays furthest away from the axis of the hyperbola. Such an arrangement is shown in FIG. 4b. Thus, the further the hyperbolic mirror is away from the objective, the narrower the field that the objective operates in.

The invention also aims to correct the astigmatism that could be induced by the hyperbolic mirror. To do this, one or two meniscus-shaped plates ME1 and ME2 are provided, these being placed near the objective pupil PU formed by the lens L'1. In the case of two meniscuses, they are placed on either side of the diaphragm PU of the objective. As shown in FIG. 4c, the meniscuses are placed with their concave faces opposite one another and the centres C1 and C2 of the meniscuses are also located on either side of the diaphragm PU in such a way that the distance between the two concave faces is less than the sum of the radii of the two concave faces. It will be preferred to provide two meniscuses with equivalent apertures.

FIG. 5 shows an illustrative example of a backprojection apparatus employing the objective of the invention thus described.

A preferably plane display device SLM, such as a spatial light modulator, is used to transmit a beam that conveys at least one image owing to the spatial modulation. This beam is transmitted by the lens L'1 (the complex lens) to the hyperbolic mirror M1, which reflects the light onto a plane mirror M2 preferably lying in the plane of the screen SC. The beam is reflected by the mirror M2 onto a second plane mirror M3, which reflects the light onto the rear face of the backprojection screen SC.

The display SLM is located on one side of a plane passing through the optical axis XX' of the lens L'1 so as to illuminate only the hyperbolic mirror M1 that occupies only part of the hyperbola HYP lying on one side of a plane passing through the axis of the latter.

It may therefore be seen that, for given image dimensions on the screen (and therefore for screen dimensions), the thickness of the optical backprojection system may be further reduced by using the architecture of FIG. 5.

FIG. 6 shows another embodiment of a backprojector according to the invention. A preferably plane mirror M4 is provided between the exit of the lens and the hyperbolic mirror. This arrangement allows the hyperbolic mirror to be moved further away from the lens so as to reduce the field angle of the beam. This backprojector arrangement therefore applies the objective described in relation to FIG. 4b. FIG. 6 therefore shows the lens L9 for reducing the field angle of the objective.

Various angles are possible as long as the beams and the components do not mutually overlap:

in the case of the large mirror M3, the angle may vary from 0 to 12° approximately; and in the case of the small mirror M4, the angle may vary from 12 to 35° approximately.

Figure 1:
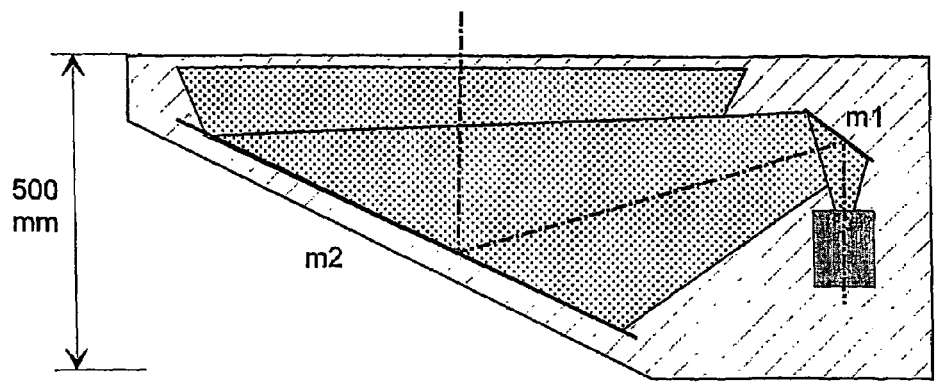
Figure 2:
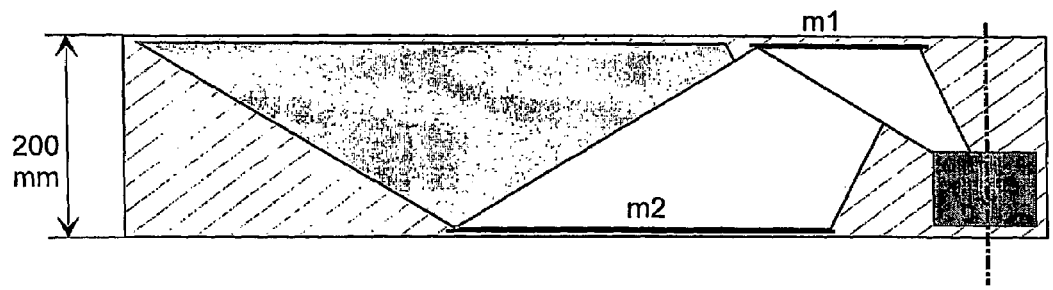
Figure 3:
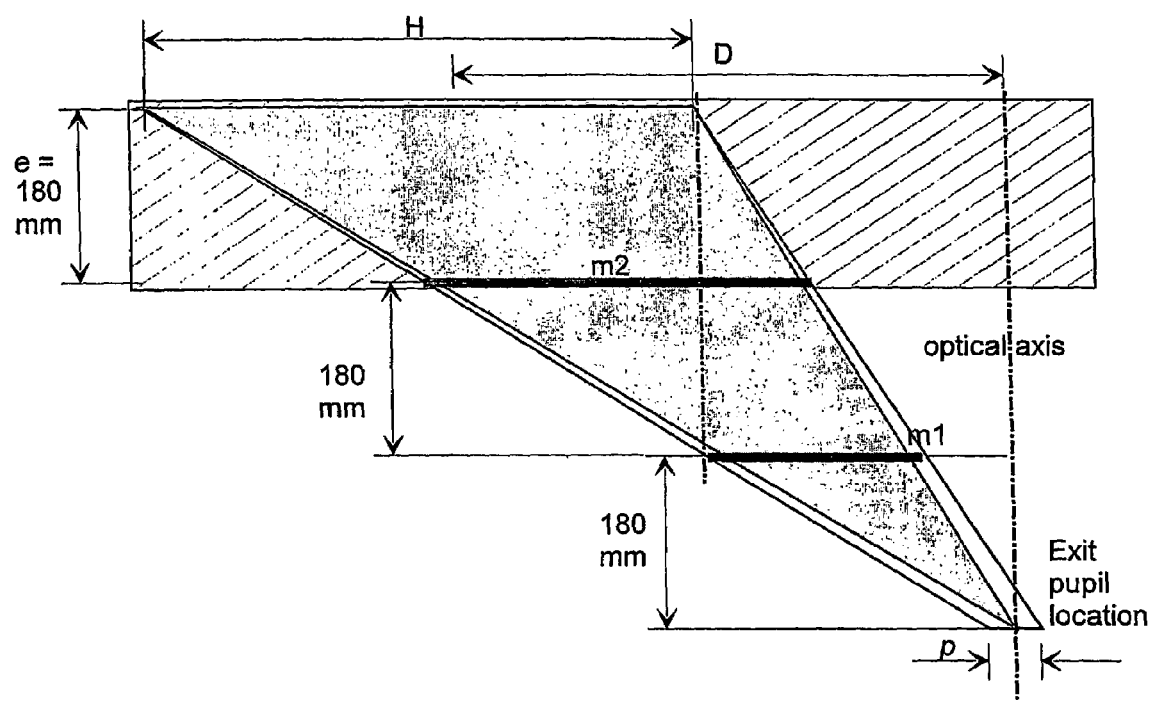
Figure 4A:
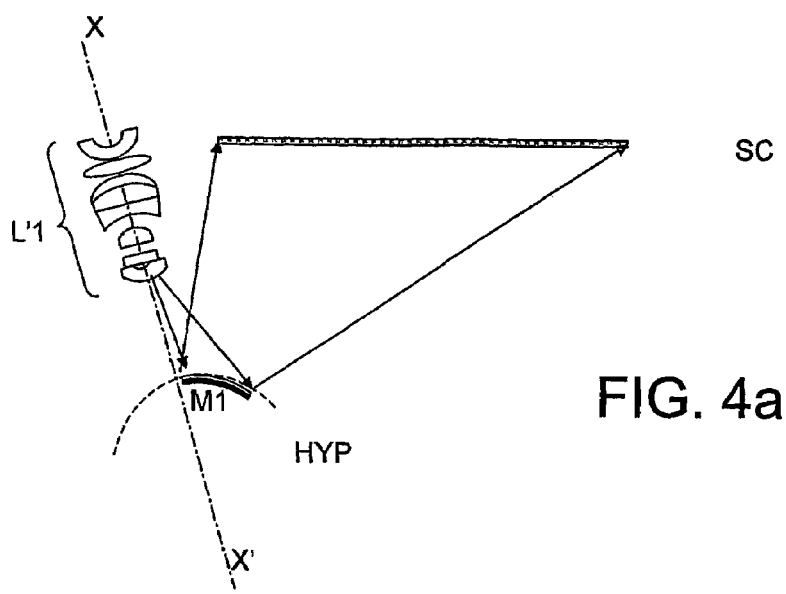
Figure 4B:
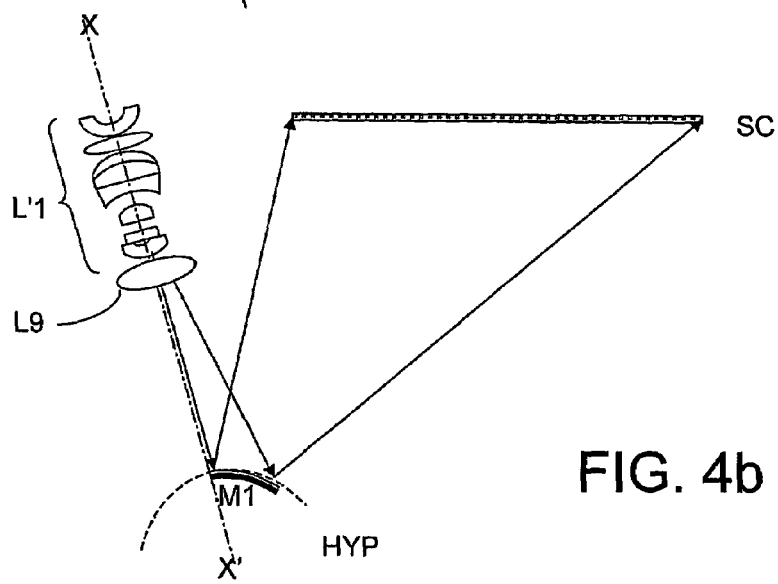
Figure 4C:
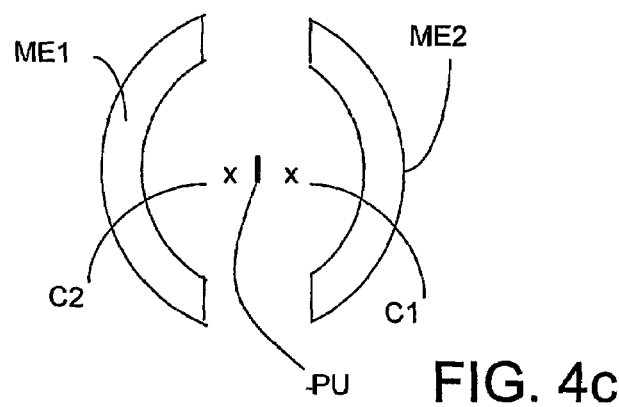
Figure 5:
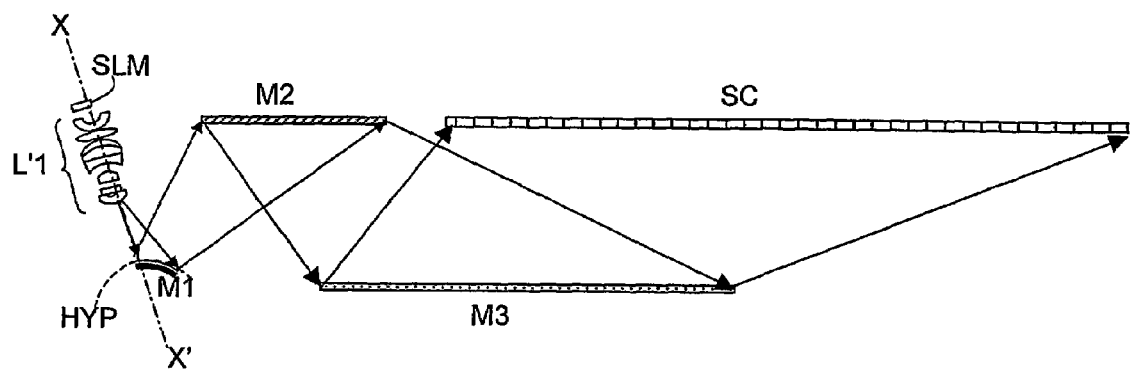
Figure 6:
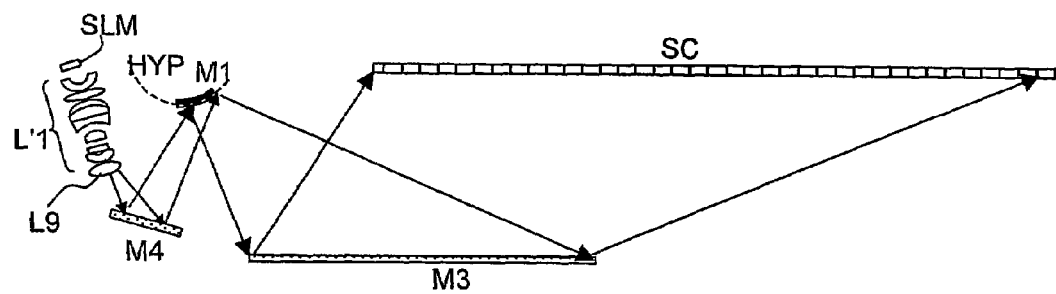
Figure 7A:
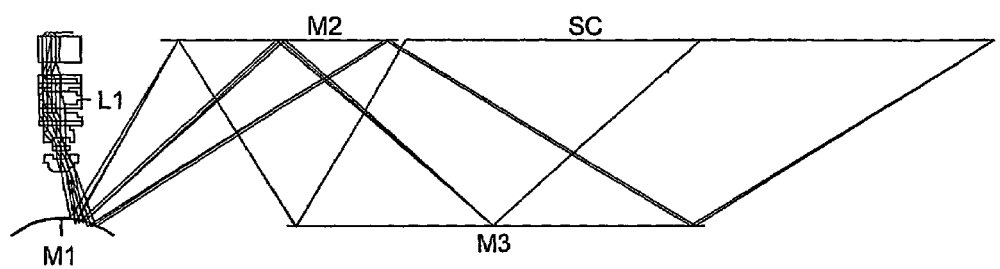
FIG. 7a shows in greater detail the propagation of a beam in the configuration of FIG. 5.
Figure 7B:
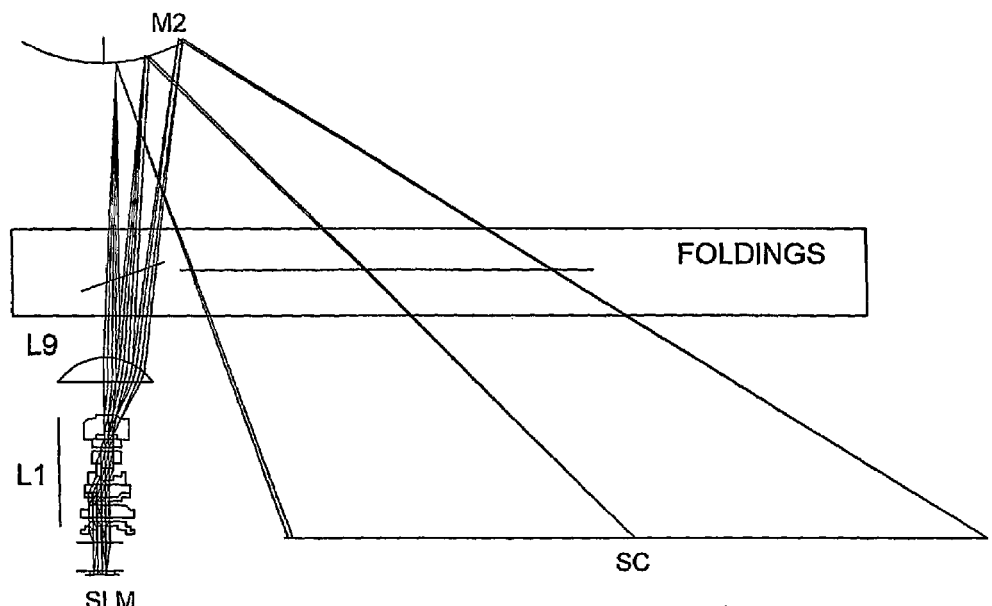
FIG. 7b illustrates more clearly, by "unfolding" the beam that was "folded" by the mirror M2, the advantage in terms of beam divergence of using a hyperbolic mirror. The folding, combined with the hyperbolic mirror, has the advantage of reducing the thickness of the optical system of the backprojector, and double folding reduces a fortiori this thickness even more.
Figure 8:
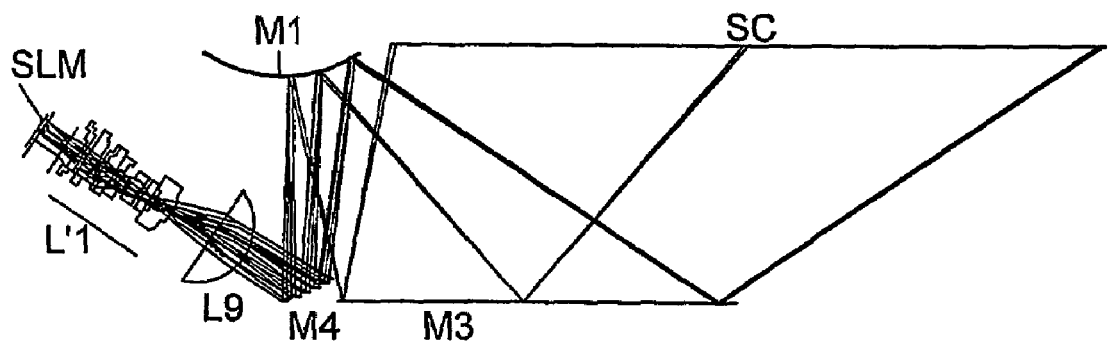
Figure 9:
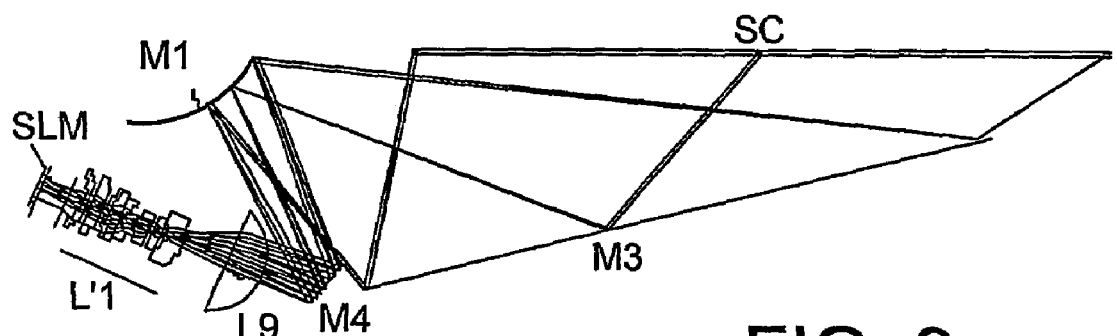

Examples are given in FIGS. 8 and 9.

FIG. 8 illustrates an example in which the mirror M4 is inclined with respect to the plane of the screen.

FIG. 9 illustrates an example in which the mirror M3 is inclined with respect to the plane of the screen.

Figure 10:
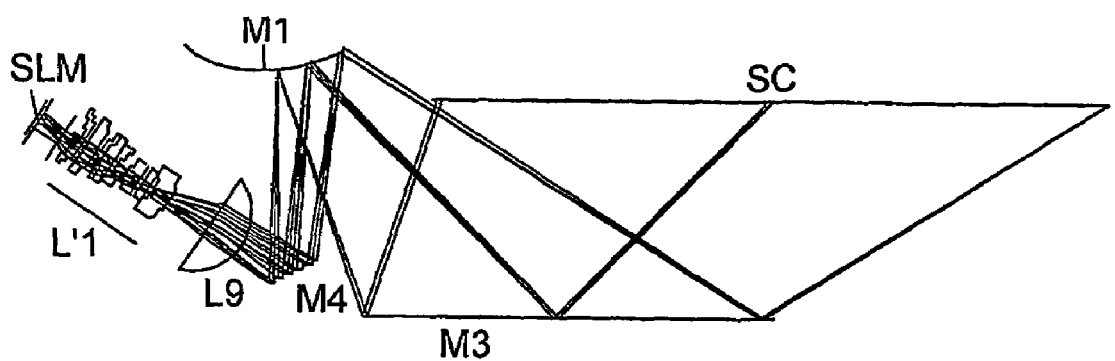

FIG. 10 shows an alternative embodiment in which the distance between the screen and the large mirror M3 is reduced and the distance between the hyperbolic mirror M1 and the large mirror M3 is increased. A peripheral field further from the optical axis is also used. Thus, a projector that is flatter as regards the screen and has an acceptable base is obtained.

Figure 11:
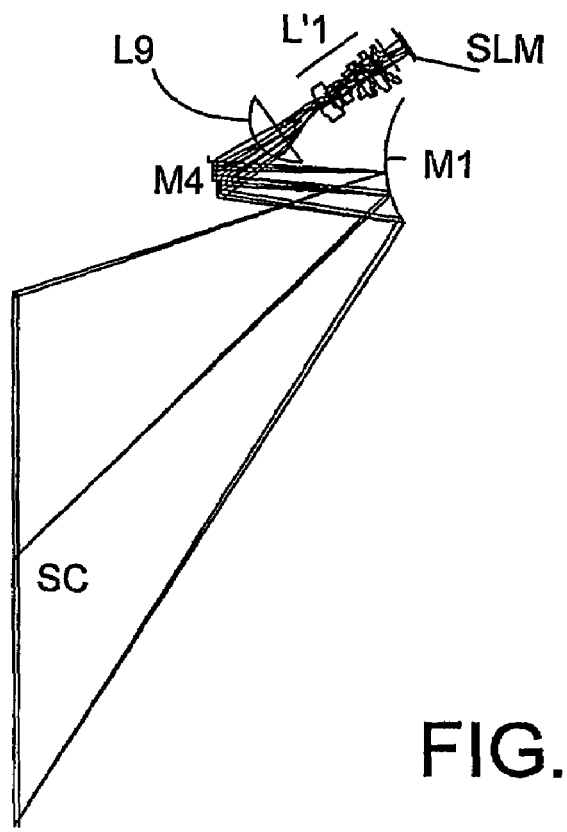

FIG. 11 shows a front projector in which the projector is located above the screen. For example, it is fixed to the ceiling in order to project onto a wall of the room.

The backprojection systems according to the invention are such that it is possible to obtain screens whose thickness can be reduced to a value of less than 20 centimetres for screens of about 1100 by 620 millimetres (screen diagonal about 1280 millimetres). This makes it possible to have screens that can be attached to a wall.

Figure 12A:
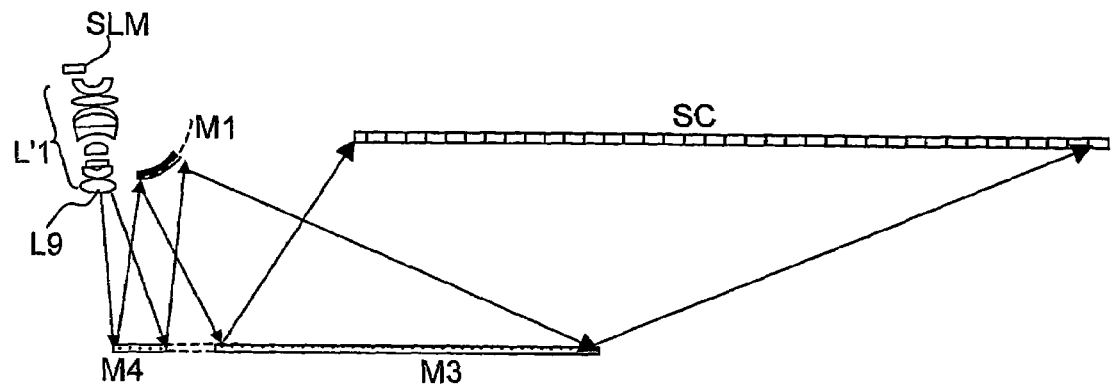
Figure 12B:
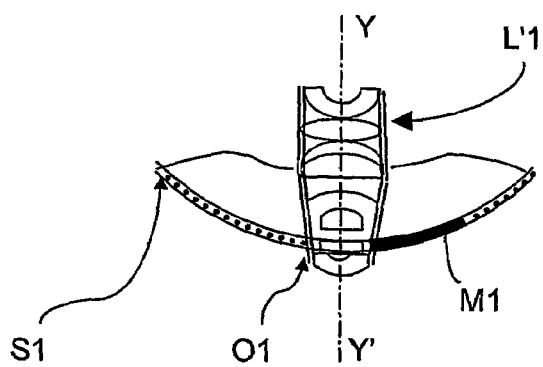

FIGS. 12a and 12b show an alternative embodiment of the objective according to the invention applied to a backprojection system. In this embodiment, the objective L'1 is physically combined with the mirror M1, and the mirror M4 lies approximately in the same plane as the mirror M3. In one embodiment, the mirrors M4 and M3 form one and the same mirror.

As may be seen in FIG. 12b, the objective L'1 is mounted in an opening O1 of a mounting support piece S1 having an approximately hyperbolic shape. Near the opening O1, the support piece S1 has a reflecting surface that constitutes the mirror M1. In one embodiment, the opening O1 is located on the axis YY' of the hyperbolic shape of the support piece S1.

Figure 13A:
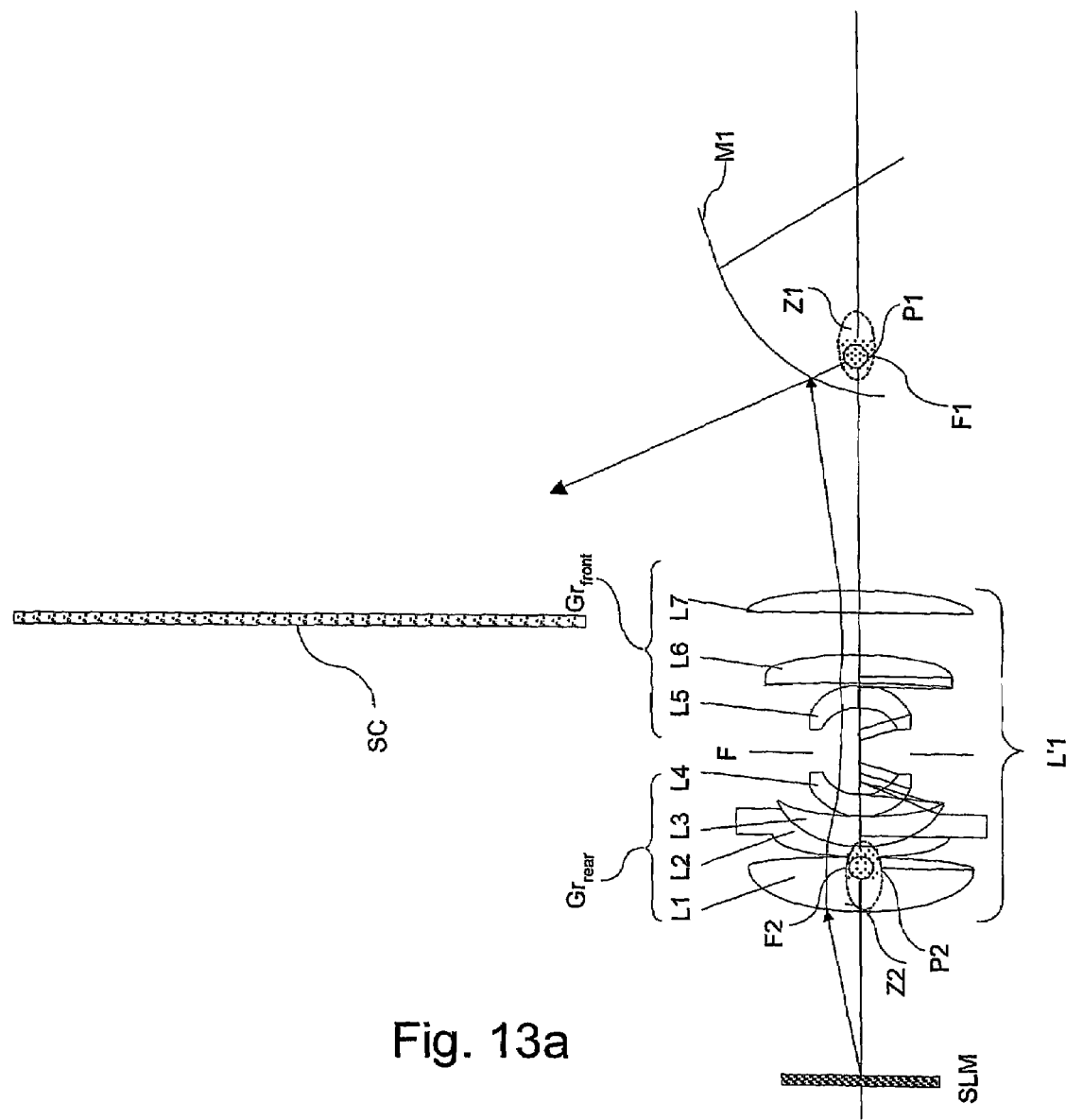

FIG. 13a shows a detailed illustrative example of the system of the invention without the mirrors M3 and M4, but a system that includes mirrors M3 and M4 would have a similar configuration.

The refractive part of the objective comprises a rear group of lenses $Gr_{rear}$ composed of four lenses L1 to L4 and of a front group of lenses $Gr_{front}$ composed of three lenses L5 to L7. The front group receives the light from the object SLM, the image of which has to be projected onto the screen SC. The object SLM is for example a spatial light modulator. The front group $Gr_{front}$ is used to illuminate the hyperbolic mirror M1 by means of the beam that it receives from the rear group $Gr_{rear}$.

According to the invention, the hyperbolic mirror M1 is located relative to the group of lenses $Gr_{front}$ in such a way that one of its foci, F2, lies in the plane of the exit pupil P2 of the front group $Gr_{front}$. The other, virtual focus F1 lies in the plane of the virtual exit pupil P1 of the system. It may therefore be seen that, according to the invention, the hyperbolic mirror conjugates the pupils P1 and P2 and has the advantage of increasing the field angle and therefore of increasing the magnification of the system.

In general, the pupil is not discrete and may suffer from aberrations. The exit pupil P2 of the front group $Gr_{front}$ therefore defines a non-discrete pupillary zone Z2. By definition, this pupillary zone Z2 is the image of the diaphragm produced by the front group of lenses $Gr_{front}$. As indicated above, the convex hyperbolic mirror has two foci, namely a first, virtual focus F1 and a real focus F2. The real focus F2 of the hyperbolic mirror M1 is preferably positioned in the exit pupillary zone Z2 of the front group. In this way, the focus F1 is located in the pupillary zone Z1 corresponding to the exit pupil P1 of the system corresponding to the combination of the front group $Gr_{front}$ and the hyperbolic mirror M1.

Since the real focus F2 is positioned in the pupillary zone Z2, the quality of the image projected on an image plane corresponding to the screen SC is optimized.

In addition, a positive lens L7 located between the said meniscus L5 and the hyperbolic mirror M1 is provided, in order to reduce the envelope of the light rays of the field so as to make it easier to fold the light beam by means of a plane mirror in order to reduce the overall size of the objective.

Figure 14A:
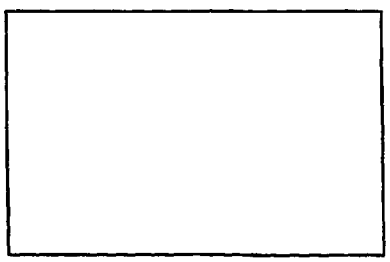
Figure 14B:
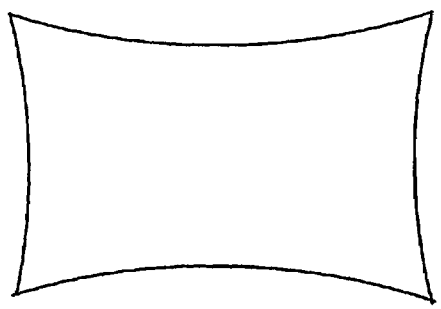

However, the hyperbolic mirror may introduce a geometric distortion, and an object as shown in FIG. 14a may deliver an image having a distortion as shown in FIG. 14b.

To correct this distortion, the invention provides in the rear group of lenses $Gr_{rear}$ a lens L1 having a surface in the form of a conic. Advantageously, this conic is a conic of the same type as the shape of the mirror M1 so as to provide an almost perfect correction of the geometric distortion. Advantageously, this conic is therefore a hyperbola.

Preferably, the ratio of the conics (hyperbolic mirror M1 and rear lens L1) is approximately proportional to the ratio of the positions of the foci of the hyperbola, that is to say the distances P2—hyperbola and P1—hyperbola.

For example, the focal length of the equivalent rear lens $Gr_{rear}$ is set, the pupil is placed at the focus of this lens and the hyperbola is placed "a certain distance away". This distance necessitates the use of a focal length and a conic for the hyperbola in order to obtain the given magnification (e.g. 64) on the screen. The shape of the conic surface of the lens or the group of lenses $Gr_{rear}$ must have in order to correct the objective is such that the ratio of this conic to the conic of the hyperbolic mirror is approximately proportional to the ratio L1/L2, L1 and L2 representing the distances of the foci of the hyperbola from the principal planes of the hyperbola. These distances, in particular the distance corresponding to P2, are the equivalent distance seen from the hyperbola through the lenses of the group $Gr_{front}$.

However, it should be noted that the hyperbolically shaped lens L1 must be remote from the diaphragm Φ of the objective, which is the case in FIG. 13a, so that the precorrection of the distortions can be made on an extended beam.

It will therefore be noted that the lens L1 thus designed not only corrects the geometric distortions but also the field curvature.

Moreover, the astigmatism defects induced by the system do not follow the same laws as the geometric distortions. They are not corrected by the above means. For this reason at least one meniscus such as L5 for correcting the astigmatism defects induced by the system is provided.

Figure 13B:
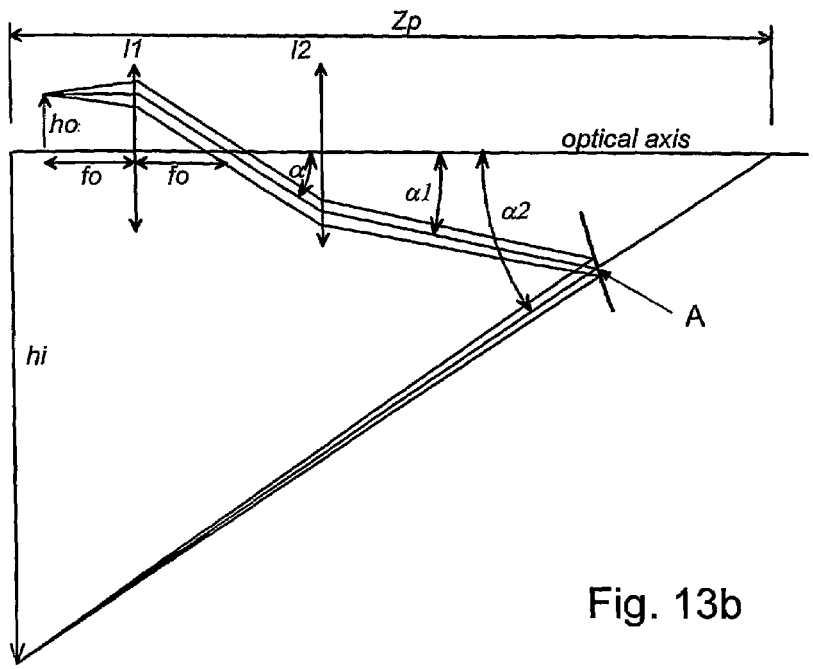

FIG. 13b shows the paraxial diagram of the objective according to the invention and depicts the principal path of the light rays emanating from the object.

In this FIG. 13b, the rear group of lenses $Gr_{rear}$ of FIG. 13a has been shown symbolically by the lens 11 and the front group of lenses $Gr_{front}$ has been shown symbolically by the lens 12.

As may be seen in FIG. 13b, the system is telecentric. The pupil on the opposite side to the object to be projected relative to the optical system lies in the focal plane of the system (focal length f0):

$\alpha = \arctan(ho/fo)$

The lens 12 is designed to produce a sharp image on the screen via the surface of the hyperbolic mirror, this condition imposing on it a power φ.

The following equation may be written:

$\phi l2 = 1/(f1 - l + zp)$ if it is accepted that the power of the hyperbolic mirror at A is low.

The new exit angle of the ray emanating from ho is:

$\alpha 1 = \alpha - k\phi l2 = \arctan(ho/fo) - (l.ho/fo).\phi l2$ action of the hyperbolic mirror.

In this system, the hyperbolic mirror is used to conjugate the pupils.

Let f1 and f2 be the positions of the foci of the hyperbola and hm the height of incidence:

$hm = f1 . \tan \alpha 1$ $\alpha 1 = \arctan(f1 \tan \alpha 2/f2)$

Figure 15:
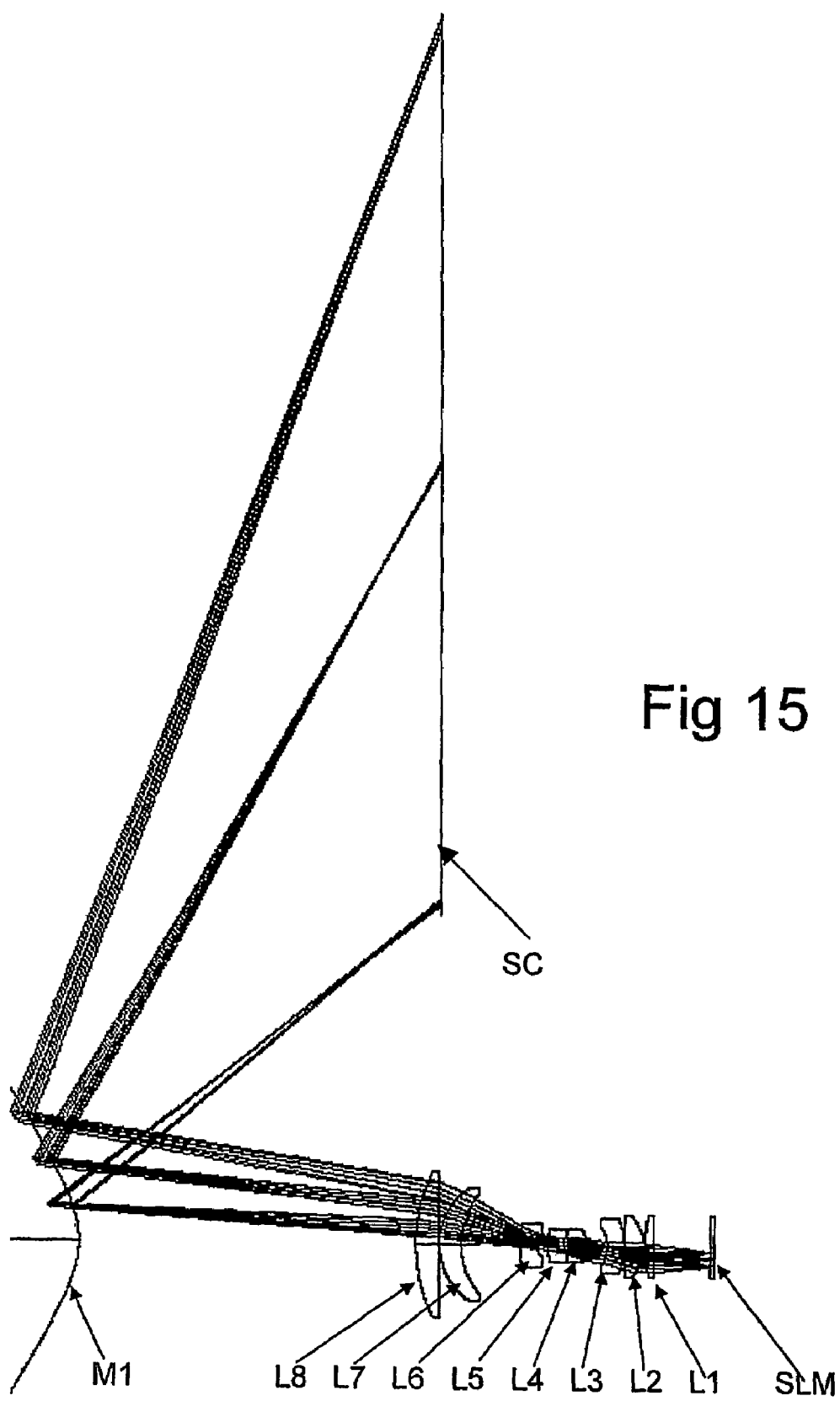

From this is deduced the equation that links the height of the object Ho to that of the image Hi:

$Hi = Zp \tan \alpha 2'$ $Hi = Zp \cdot \tan\left(\arctan\frac{f1 \cdot \tan((\arctan(ho/fo) - (l.ho/fo) \cdot \varphi l2)}{f2}\right)$ FIG. 15 shows an illustrative example of an objective according to the invention. The characteristics of the various elements of this objective may be summarized in the following table:

| Name | Curvature | Radius of curvature | Thickness | Material | Half-diameter | Conic |
|---|---|---|---|---|---|---|
| L1 | 0.0000 | | 6.8071 | BK7 | 22.0000 | |
| | −0.0114 | −87.6150 | 0.4000 | | 22.0000 | |
| L2 | 0.0396 | 25.2208 | 13.3026 | FK5 | 22.0000 | −1.1706 |
| | 0.0000 | | 0.4000 | | 22.0000 | |
| L3 | 0.0186 | 53.6495 | 11.3500 | SF4 | 19.0000 | |
| | 0.0431 | 23.2180 | 13.9658 | | 12.9109 | |
| L4 | 0.0532 | 18.8123 | 13.4988 | BSM14 | 10.8059 | |
| | 0.0000 | | 0.0000 | | 7.3184 | |
| PHYSICAL STOP | 0.0000 | | 2.0910 | | 7.3184 | |
| L5 | −0.0265 | −37.6993 | 12.0000 | SF4 | 6.3667 | |
| | −0.0348 | −28.7256 | 7.0084 | | 10.8059 | |
| L6 | −0.0850 | −11.7610 | 12.0000 | SF4 | 8.1631 | |
| | −0.0170 | −58.7766 | 40.0000 | | 14.6094 | |
| L7 | −0.0188 | −53.2774 | 15.0000 | K10 | 34.6733 | |
| | −0.0214 | −46.7492 | 0.4000 | | 39.3627 | |
| L8 | 0.0000 | | 15.4624 | BK7 | 49.6520 | |
| | −0.0088 | −113.2711 | 233.0000 | | 50.6673 | |
| M1 | 0.0171 | 58.5615 | −250.0000 | MIRROR | 105.3846 | −3.5600 |
| | | | | | 1007.2357 | |
| | 0.0000 | | 0.0000 | | 7 | |

The invention claimed is:

1. Projection objective comprising:
    a combination of lenses comprising a front group of lenses and a rear group of lenses that are placed on either side of a diaphragm and are intended to transmit a divergent light beam to a flat screen, and
    at least one hyperbolically shaped mirror, called a hyperbolic mirror, oriented so as to receive, on its convex face, the light coming from the said front group of lenses and to transmit the said beam to the said screen, wherein an axis of the hyperbolic mirror that passes through a foci of the hyperbolic mirror, coincides with an optical axis of the combination of lenses.

2. Objective according to claim 1, wherein a first focus of the said hyperbolically shaped mirror is positioned in the region, called the pupil region, defined by the image of the said diaphragm by the said front group of lenses.

3. Objective according to claim 1, wherein at least one of the said rear group of lenses and the said front group of lenses includes at least one geometric-distortion correcting optic that has a conic shape.

4. Objective according to claim 3, wherein the said geometric-distortion correcting optic is located in the rear group of lenses and has a hyperbolic shape.

5. Objective according to claim 4, wherein the said geometric-distortion correcting optic is located in that part of the said rear group of lenses furthest away from the said diaphragm.

6. Objective according to claim 1, wherein it includes at least one meniscus located in that part of the said front group or of the said rear group that is closest to the said diaphragm, the said meniscus or meniscuses being designed to correct the astigmatism defects induced by the said hyperbolic mirror.

7. Objective according to claim 1, wherein it uses a peripheral field of the object plane and in that the said hyperbolic mirror is located entirely on one side of a plane passing through the axis of symmetry of the hyperbola so as to fold the beam without the objective casting a shadow on the image.

8. Objective according to claim 1, wherein it includes a first return mirror that is placed near the front group of lenses in a first direction that corresponds to the direction of the beam transmitted by the lens, and reflects the said beam in a second direction, the said hyperbolically shaped mirror being located along the second direction and being oriented in order to receive the beam reflected by the said first return mirror.

9. Objective according to claim 8, wherein the second direction makes an angle of less than 60° with the said first direction.

10. Objective according to claim 1, wherein it includes two meniscuses located on either side of the said diaphragm, the concave parts of which are oriented towards the said diaphragm.

11. Objective according to claim 1, wherein the said diaphragm lies in the focal plane of the rear group of lenses.

12. Objective according to claim 11, wherein it includes a positive lens located between one of the said meniscuses belonging to the said front group of lenses and the said hyperbolic mirror.

13. Projection apparatus applying the objective according to claim 1, wherein it includes a display located on one side of the optical axis of this rear group of lenses and making it possible to transmit a modulated light beam to a region of the rear group of lenses that is located on one side of the axis of the said rear group of lenses.

14. Projection apparatus according to claim 13, wherein it is a backprojection apparatus and includes at least one second return mirror that receives the light reflected by the said hyperbolic mirror and reflects it onto the rear face of the screen of the said back projection apparatus.

15. Projection apparatus according to claim 14, the said second return mirror makes a zero angle with the plane of the said screen.

16. Projection apparatus according to claim 14, wherein the said second return mirror lies in the same plane as a third return mirror placed near the front group of lenses along a first direction corresponding to the direction of the beam transmitted by the lens and reflecting the said beam in a second direction, the hyperbolically shaped mirror being located along the second direction and being oriented in order to receive the beam reflected by the said third return mirror.

* * * * *